United States Patent [19]

Bird, Sr. et al.

[11] Patent Number: 4,635,747
[45] Date of Patent: Jan. 13, 1987

[54] MARINE SEISMIC VIBRATOR HAVING SUPPORT STRUCTURE INCLUDING VIBRATION ISOLATORS

[75] Inventors: James M. Bird, Sr.; Jesse M. Lewis, both of Tulsa, Okla.

[73] Assignee: Industrial Vehicles International, Inc., Tulsa, Okla.

[21] Appl. No.: 750,329

[22] Filed: Jun. 28, 1985

[51] Int. Cl.⁴ .................. G01V 1/04; H04R 11/00; H04R 1/02
[52] U.S. Cl. .................... 181/120; 181/402; 367/189; 367/143
[58] Field of Search .................. 114/44, 50, 242, 244, 114/245, 247, 249, 252, 253, 312, 322; 181/102, 106, 110, 113, 114, 118, 119, 120, 402; 367/2, 3, 4, 106, 130, 141, 143, 173, 176, 189, 190; 340/850

[56] References Cited

U.S. PATENT DOCUMENTS

| | | | |
|---|---|---|---|
| 2,060,670 | 11/1936 | Hartman | 114/312 X |
| 2,397,137 | 3/1946 | Glennon et al. | 340/850 |
| 3,329,930 | 7/1967 | Cole et al. | 181/120 |
| 3,349,367 | 10/1967 | Wisotski | 367/143 |
| 3,394,775 | 7/1968 | Cole et al. | 181/120 |
| 3,434,562 | 3/1969 | Johnson | 181/120 |
| 3,467,984 | 9/1969 | Otto | 181/118 |
| 3,482,646 | 12/1969 | Brown et al. | 181/120 |
| 3,793,623 | 2/1974 | Gongwer | 114/253 X |
| 3,866,709 | 2/1975 | Mifsud | 367/189 X |

Primary Examiner—Charles T. Jordan
Assistant Examiner—Brian S. Steinberger
Attorney, Agent, or Firm—Kanz Scherback & Timmons

[57] ABSTRACT

Mounting structure for a marine seismic vibrator comprising at least three acoustic isolators equally spaced apart about an upper housing of the vibrator. Each of the isolators comprises a pair of spaced mounting pads mechanically secured to the housing. A U-shaped bracket having a base and depending spaced leg portions is attached to the mounting pads by way of a low-pass acoustic filter. A rectangular shaped bracket has a base, a top and a pair of spaced vertical sidewalls. The rectangular shaped bracket is located between the spaced leg portions of the U-shaped bracket and a resilient means is mounted between the bases of the U-shaped bracket and the rectangular bracket to provide a high-pass acoustic filter. Means mechanically connected to the top of the rectangular brackets to the tops of the mechanical brackets secure all the isolators to a common point at the center of the housing.

5 Claims, 5 Drawing Figures

MARINE SEISMIC VIBRATOR HAVING SUPPORT STRUCTURE INCLUDING VIBRATION ISOLATORS

BACKGROUND OF INVENTION

1. Field of Invention

This invention relates to marine seismic vibrators and more particularly to supporting structure for the vibrator which provide vibration isolation by attenuating the vibrations emanating at the inertial mass-vibrations that would be transmitted and damage supporting structure and towing structure during operation of the marine seismic vibrator.

2. Prior Art

Over the years many efforts have been made to provide a commercial marine seismic vibrator to utilize in marine operations the advantages offered by land based vibrators.

A typical marine vibrator is illustrated and described in U.S. Pat. No. 3,349,367 issued to S. S. Wisotski. Such vibrators comprise a sonic radiator driven by a hydraulic ram. The hydraulic pressures are derived from a surface source and applied by way of high pressure hoses to the hydraulic ram under control of a servo valve to effect movement of the sonic radiator over a predetermined frequency range. The vibrator is programed through control signals to generate energy in the seismic frequency band between 10 and 190 Hz. In conducting the operations the vibrator output is swept through a range of frequencies as above noted either in an upsweep or downsweep.

The inertial mass for the vibrator is provided by the structure housing the hydraulic ram and sonic radiator. Accordingly the housing such as that shown in FIG. 5 of the aforesaid patent will vibrate at the same frequency as the sonic radiator and these vibrations are transmitted to any structure mounted on the housing, for example, that utilized to connect the marine vibrator to surface supporting and towing means as well as to any equipment mounted to the structure near the vibrator.

The vibrational forces transmitted from the housing to the supporting structure attached thereto are significant. Water is a difficult medium in which to move structured parts. At the higher vibrational frequencies these forces moving the supporting structure in the water will cause the supporting structure literally to tear apart. Efforts at providing adequate supporting structure in view of these forces have in the past taken the form of massive metal components designed to have resonant frequencies outside the operating range of the vibrator. The result has been significant in increase in the weight of the marine vibrator assembly and with unsatisfactory results. These massive elements are torn apart at their juncture after but a few thousand sweeps of the marine transducer due principally to the forces encountered in moving such structure in water at the operating frequencies of the marine vibrator.

Accordingly it is an object of the present invention to provide supporting structure for the marine transducer which will withstand the forces encountered in moving objects at high speed in a body of water and significantly increase the life expectancy of such structures to give rise to a relatively light weight commercially viable marine seismic vibrator.

SUMMARY OF INVENTION

The objects of the present invention are met by providing vibration or acoustic isolation between the inertial mass of the vibrator as represented by the housing and the mechanical supporting structure for the vibrator. This isolation is achieved in accordance with the present invention by providing a low pass mechanical filter located near the upper surface of the housing in series with a high pass filter located above the low pass filter. The combined effect of the serial connected filters is to significantly reduce the transmission of vibrations into the supporting structure and thereby significantly extend the life expectancy of the structure.

More particularly, means are secured to the upper housing of the vibrator to provide for mechanical connection to supporting and towing means at the surface of the water. The means secured to the upper housing comprises at least three acoustic isolators equally spaced about the upper housing. Each of the isolators comprises a pair of spaced mounting pads mechanically secured to the housing. A U-shaped bracket having a base and the depending spaced leg portions is secured to the spaced mounting pads at the free ends of the leg portions by way of a low pass acoustic filter. A rectangular shaped bracket having a base, a top and a pair of spaced vertical side walls is located in part between the spaced leg portions of the U-shaped bracket. Resilient means is mounted to and between the bases of the U-shaped bracket and the rectangular bracket provide a high pass acoustic filter. Means mechanically connected to the top of the rectangular bracket secure all the isolators to a common point at the center of the housing. In the preferred embodiment the acoustic high-pass filter is provided by an airbag, pressurized above atmospheric pressure while the low-pass filter is comprised of rubber bushings each mounted between the ends of the leg portions of the U-shaped bracket and the pair of mounting pads.

Each of the isolator assemblies also includes a stabilizer rod having one end pivotally connected to the upper housing and a second end pivotally connected to one sidewall of the rectangular bracket. The stabilizer rod limits the relative movement between the U-shaped bracket and the rectangular bracket to a substantially vertical direction thus overcoming the horizontal forces exerted against the rectangular bracket during the towing of the marine vibrator.

The leg portions of the U-shaped bracket and the sidewalls of the rectangular bracket are provided with openings which are made as large as possible without significantly weakening the mechanical strength of the brackets in order to maximize the contact between the air bag and the surrounding water thus to reduce cavitation effects on the outer surface of said bag as it expands and contracts in attenuating the low frequency vibrations from the housing.

DETAILED DESCRIPTION

Figure 1:
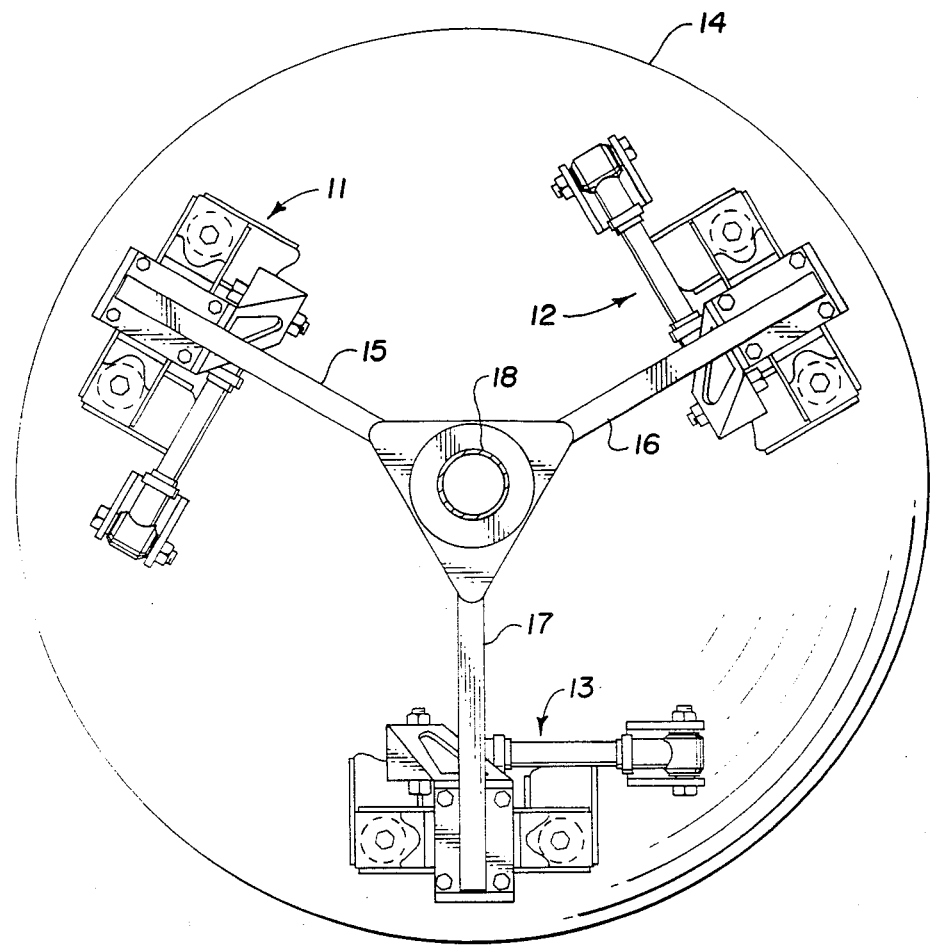
FIG. 1 is top plan view of the housing of the marine seismic vibrator illustrating three isolators of the present invention spaced apart and mounted to the upper surface of the housing.

Referring now to FIG. 1 wherein isolators 11, 12 and 13, embodying the present invention, are shown mounted in equally spaced relationship one to the other to an upper housing 14 of a marine seismic vibrator. The isolators 11, 12 and 13 are mechanically connected by way of arms 15, 16 and 17 to a common point 18 which provides connection to surface towing and supporting structure (not shown) as well as providing means for supporting other equipment associated with the operation of the marine seismic vibrator such as desurgers in the hydraulic lines supplying high pressure fluid for the operation of the vibrator. Details of a marine vibrator are described in U.S. Pat. No. 3,349,367 issued Oct. 24, 1967 to S. S. Wisotsky. A preferred marine vibrator is described in co-pending application Ser. No. 670,378 filed Nov. 9, 1984 in the name of S. S. Wisotsky and entitled Marine Seismic Source. Both application Ser. No. 670,378 and the present application are assigned to a common assignee and the disclosure of the above copending application is in its entirety incorporated by reference into the present application.

All marine vibrators have in common a sonic radiator driven by a hydraulic ram under control of a servo valve. High pressure hydraulic fluids directed by the servo valve, cause the hydraulic ram to move the sonic radiator back and forth in the surrounding water environment to generate a variable frequency acoustic signal in the seismic range, for example, from 30 to 170 Hz. The vibrations generated by the seismic source are transmitted into the inertial rear mass of the source, which includes the upper housing. The upper housing literally shakes over the range of frequencies generated by the marine source, and these vibrations are coupled to any structure mounted to the upper housing 14. These vibrations cause the structure to move with the upper housing in the water and absent the present invention, such movement in the water environment, at the operating frequencies of the source cause the supporting structure for the source to literally tear apart, particularly at welds and cause connecting bolts to shear. The present invention provides means whereby the vibration or vertical movement of the housing of the source is prevented from transmission through supporting structure, by providing in that supporting structure, vibration isolating characteristics.

Figure 2:
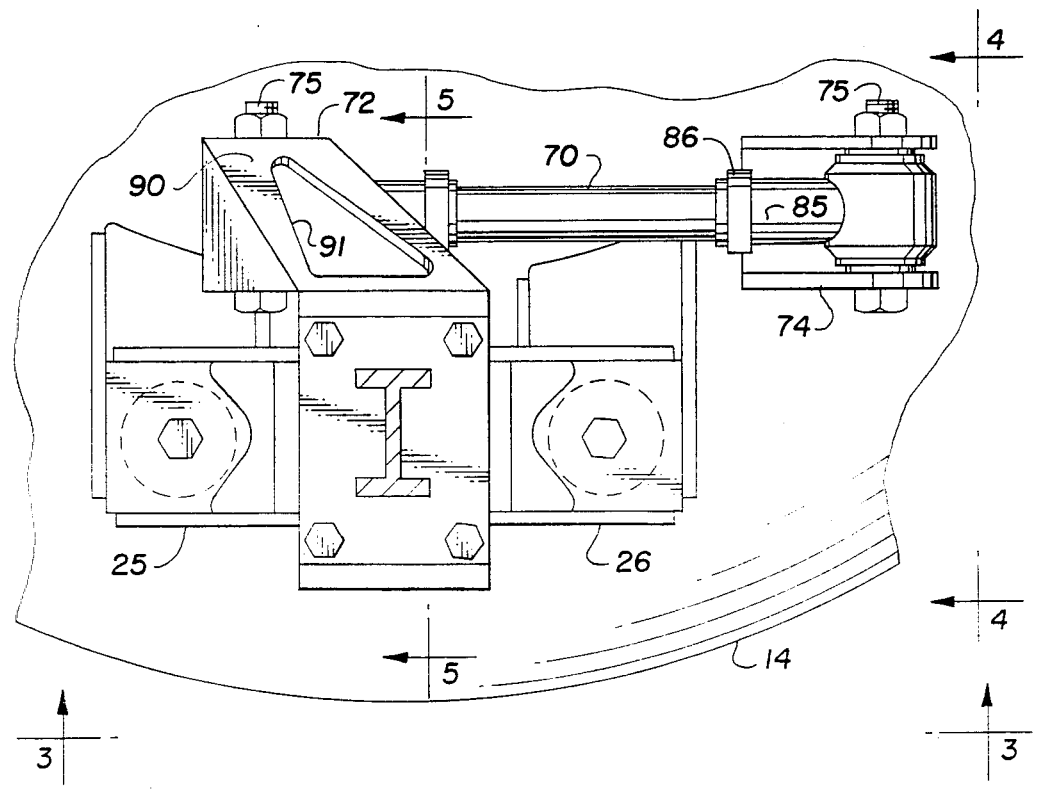
FIG. 2 is an enlarged top plan view of one of the isolators of FIG. 1.
Figure 3:
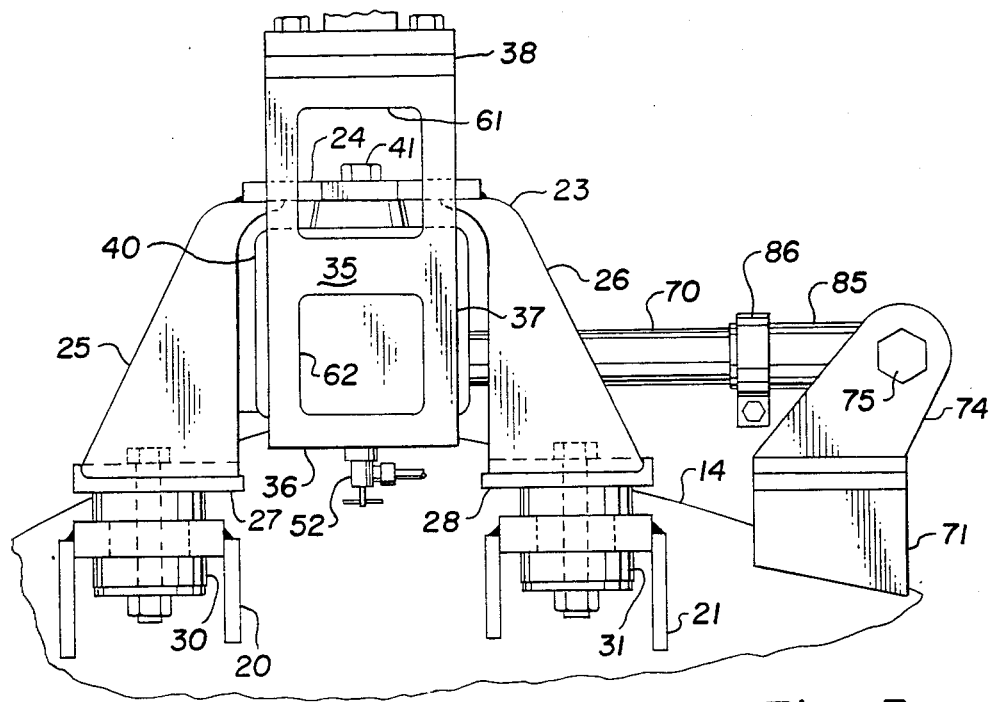
FIG. 3 is a side plan view taken along line 3—3 of FIG. 2.

Referring now to FIGS. 2 and 3, wherein one of the isolator assemblies of FIG. 1, the isolator assembly 11, is shown enlarged. In as much as the vibrator assemblies are identical the description of one will provide a complete understanding of all. The isolator assembly 11, is comprised of a pair of mounting pads 20 and 21 each secured as by welds to the housing 14. A substantially U-shaped bracket 23 includes a base 24 and two depending spaced leg portions 25 and 26. The free or lower ends 27, 28 of the leg portions are secured to the mounting pads 20 and 21 by way of low-pass acoustic filters 30 and 31.

A rectangular shaped bracket 35 (FIGS. 3 and 4) is fitted between the spaced leg portions 25 and 26 of the U-shaped bracket 23. The rectangular shaped bracket 35 includes a base 36, a pair of spaced vertical sidewalls 37 and a top 38. A resilient means 40 is mounted to and between the bases 24 and 36 respectively of the U-shaped bracket 23 and the rectangular bracket 35. The resilient means 40 provides a high-pass acoustic filter. The resilient means 40 is preferably an air-bag pressurized above atmospheric pressure and shown secured to the base of the U-shaped bracket by way of a bolt 41. As shown, the low-pass filters 30, 31 are connected in series with the high-pass filter provided by air-bag 40 and serve significantly to attenuate vibrations emanating at the housing and prevent the transmission of these vibrations into and through the supporting structure for the source as well as to other equipment associated with the source and mounted to the source.

Figure 4:
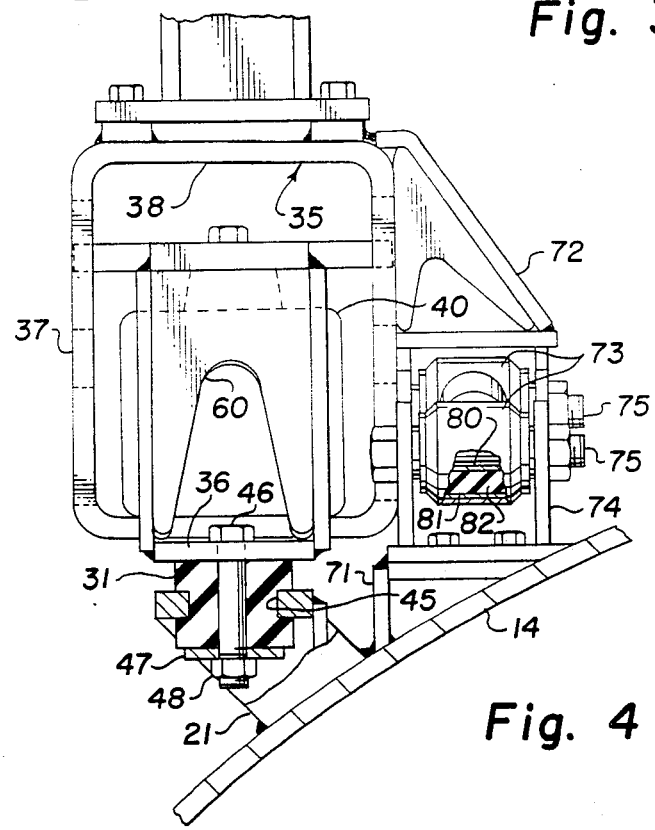
FIG. 4 is an end view of an isolator taken along line 4—4 of FIG. 2 and having portions broken away to illustrate the structure of the low-pass acoustic filters.

As best shown in FIG. 4, each low-pass isolator or filter 31 is comprised of a cylinder or bushing preferably of neoprene passing through an aperature 45 in the mounting pad 21. The bushing is secured between the mounting pad 21 and the base 36 of the U-shaped bracket by an assembly including a bolt 46, washer 47 and nut 48. Upon tightening the nut 48 on the bolt 46, the bushing 45 is squeezed between the lower portion of the base 36 and the washer 47 to assume the shape illustrated. The low-pass filter 31 including the bushing 45 severely attenuates high frequency vibrations emanating from the housing 14 while at that same time providing a reliable mount for the source.

Figure 5:
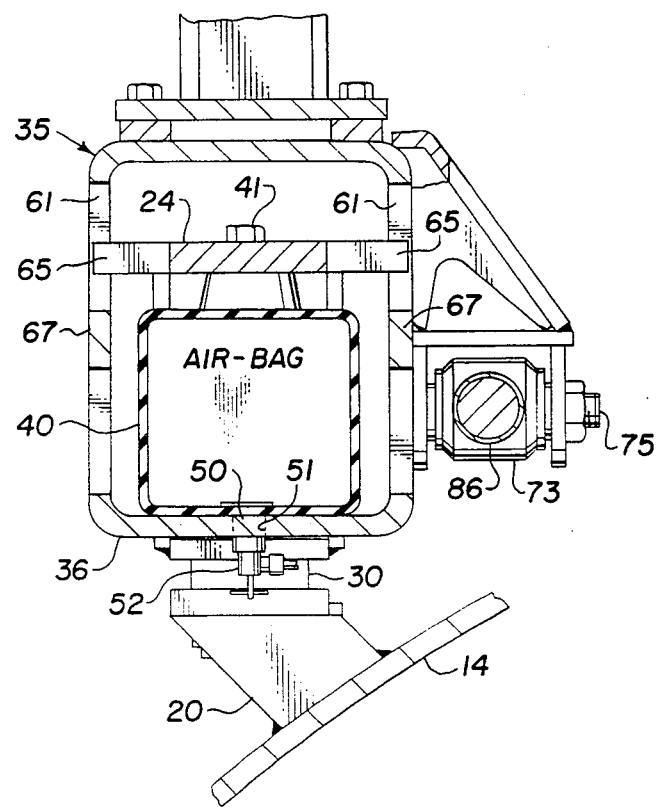
FIG. 5 is a section taken along line 5—5 of FIG. 2 illustrating the mounting of the high-pass filter within the relatively moveable mounting brackets.

The high-pass filter, comprised of air-bag 40 is best illustrated in FIG. 5 where the air-bag is shown connected at its upper portion by way of bolt 41 to the base 24 of the U-shaped bracket 23 the lower portion of the air-bag 40 includes a conduit 50 passing through an aperature 51 and terminating in a petcock valve 52. The conduit 50 passing through the aperature in close fitting relation prevents lateral movement between the bottom of the air-bag 40 and the base 36 of the rectangular shaped bracket. The petcocks valve 52 for each of the air-bags 40 are connected to a common source of compressed air (not shown). Each of the airbags is equally charged with compressed air at approximately 40 PSI by opening each of the petcocks to the common source to assure equal pressures to each of the air-bags 40 and upon attaining the desired pressure the petcock valves 52 are closed. The air-bag has a natural frequency of 1.25 Hz and provides an excellent filter for significantly attenuating the low frequency vibrations generated at the housing 14.

Those parts of the brackets 26 and 35 opposite the sidewalls of the air-bag 40 have portions removed providing holes which couple the air-bag to the surrounding water outside the brackets. For example, hole 60 is formed in the leg portion 26 of the bracket 23 and holes 61 and 62 are formed in the sidewalls 37 of the bracket 35. These holes are made as large as possible without significantly weakening the structural strength required of the brackets in supporting the weight of the source. The air-bag in an operating mode will expand and contract laterally in dampening or attenuating the low frequency vibrations from the housing. The increased coupling to the surrounding water afforded by the various aperature or holes 60–62 significantly reduce cavitation effects on the outer surface of the air-bag to increase the useful life of the air-bag.

The downward movement of the U-shaped bracket 23 is limited by a stop mechanism afforded by ears or extension 65 integral with the base 24 of the bracket 23 and extending into the aperatures 61 of the rectangular shaped bracket 35. The ears or extensions 65 will contact the upper surface of the webs 67 limiting the downward movement of the U-shaped bracket 23 and thus limiting the amount of compressive force applied to the air-bag 40. When the air-bag is in an operating mode with the marine source immersed in water the displacement of the source will cause the extension 65 to ride in the slots or openings 61 in a position approximately as illustrated in FIG. 5. However, as the source is withdrawn from the water the effective weight of the source and associated equipment will be increased causing the extension 65 to engage the upper surface of the web 67 thus limiting the compressive forces on the air-bag 40 and avoiding damage thereto.

As the marine source is towed through the water, lateral forces will be applied to the supporting structure and particularly to the rectangular bracket 35. Such forces would tend to cause the rectangular bracket 35 to shift from its normal vertical position. In order to avoid the effects such an attitude of the rectangular bracket would have upon the operability of the air-bag, there is provided a stabilizer assembly including stabilizer rod 70 having one end pivotally connected to the housing 14 by the way of a mounting pad 71. The opposite or free end of the rod 70 is pivotally connected to the rectangular bracket 35 by way of mounting structure 72. The pivotal connection for opposite ends of the stabilizer arm or rod are identical and comprise a hub 73 positioned between spaced arms 74 of the mounting pad 71. The hub 73 is secured to the spaced arms 74 by way of a bolt and nut assembly 75 passing through a bushing comprised of an inner annular metal cylinder 80 and an outer annular metal cylinder 81. Filling the annulus between the cylinders 80, 81 is a cylinder of neoprene which functions as a low-pass filter attenuating the high frequency vibrations generated at the housing 14 and preventing their transmission to the other structural parts of the mounting assembly. The hub 73 is connected to the stabilizer rod 70 by way of a split cylinder 85. The length of the stabilizer assembly is thereby adjustable by moving the rod 70 within the split cylinder 85. When the desired adjustment has been completed the position between the cylinder 85 and the rod 70 is locked in place by a clamp 86. Similar connections are made at the free end of the rod 70.

The stabilizer rod assembly will control the movement of the rectangular bracket 35 and limit it to a substantially vertical movement thereby avoiding distortion of the air-bag 40. It will be noted particularly in FIG. 2 that the structure connecting the stabilizer rod assembly to the sidewall of the rectangular bracket 35 includes a plate 90 having central portion 91 removed again to increase the coupling between the air-bag 40 and the surrounding water.

Now having described the invention, and the preferred embodiment thereof, other modifications will become apparent to those skilled in the art and it is intended to cover such modifications as fall within the scope of the appended claims.

What is claimed is:

1. A marine seismic vibrator for immersion in a body of water to generate variable frequency acoustic sweep frequencies and including an upper housing, means secured to the upper housing for mechanical connection to means at the surface of the water supporting the immersed vibrator, said means secured to said upper housing comprising at least three acoustic isolators equally spaced apart about said upper housing, each of said isolators comprising a pair of spaced mounting pads mechanically secured to said housing, a U-shaped bracket having a base and depending spaced leg portions, the free ends of said leg portions being secured to said spaced mounting pads by way of a low-pass acoustic filter, a rectangular shaped bracket having a base, a top, and a pair of spaced vertical side walls, said rectangular shaped bracket being located between said spaced leg portions of said U-shaped bracket, resilient means mounted to and between said bases of said U-shaped bracket and said rectangular bracket to provide a high-pass acoustic filter, and means mechanically connected to the top of said rectangular bracket for securing all said isolators to a common point at the center of said housing.

2. The marine seismic vibrator of claim 1 in which high-pass acoustic-filter is an air bag pressurized above atmospheric pressure.

3. The marine seismic vibrator of claim 1 in which said low-pass acoustic-filter is comprised of rubber bushings each mounted between the ends of the legs of said U-shaped bracket and said pair of mounting pads.

4. The marine seismic vibrator of claim 1 including a stabilizer rod having one end pivotally connected to said upper housing and a second end pivotally connected to one side wall of said rectangular bracket to limit the relative movement between said U-shaped bracket and said rectangular bracket to a substantially vertical direction.

5. The marine seismic vibrator of claim 2 in which the leg portions of said U-shaped bracket and the side walls of said rectangular bracket are provided with openings to maximize the contact between the air bag and surrounding water to reduce cavitation effects upon the outer surface of said air bag.

* * * * *